(12) United States Patent
Price et al.

(10) Patent No.: US 11,138,811 B2
(45) Date of Patent: Oct. 5, 2021

(54) USING AUGMENTED REALITY MARKERS FOR LOCAL POSITIONING IN A COMPUTING ENVIRONMENT

(71) Applicant: Capital One Services, LLC, McLean, VA (US)

(72) Inventors: Micah Price, Plano, TX (US); Geoffrey Dagley, McKinney, TX (US); Qiaochu Tang, The Colony, TX (US); Jason Hoover, Grapevine, TX (US); Stephen Wylie, Carrollton, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 60 days.

(21) Appl. No.: 16/781,186

(22) Filed: Feb. 4, 2020

(65) Prior Publication Data

US 2021/0056766 A1 Feb. 25, 2021

Related U.S. Application Data

(63) Continuation of application No. 16/546,286, filed on Aug. 20, 2019, now Pat. No. 10,593,128.

(51) Int. Cl.
*G06T 19/20* (2011.01)
*G06K 9/00* (2006.01)
*G06T 19/00* (2011.01)
*G06T 7/70* (2017.01)

(52) U.S. Cl.
CPC .......... *G06T 19/20* (2013.01); *G06K 9/00671* (2013.01); *G06T 7/70* (2017.01); *G06T 19/006* (2013.01); *G06T 2207/30204* (2013.01); *G06T 2219/2004* (2013.01)

(58) Field of Classification Search
None
See application file for complete search history.

(56) References Cited

U.S. PATENT DOCUMENTS

2014/0357366 A1* 12/2014 Koganezawa ...... A63F 13/5255
463/31
2016/0265919 A1* 9/2016 Schuller .................... G01S 5/16

* cited by examiner

*Primary Examiner* — Frank S Chen
(74) *Attorney, Agent, or Firm* — Kacvinsky Daisak Bluni PLLC

(57) ABSTRACT

Techniques for providing indirect local geo-positioning using AR markers are disclosed. A first moveable AR marker can be located or found by a computing device. A location of the first moveable AR marker can be known and shared with the computing device. The location of the first moveable AR marker can be based on distance between the first moveable AR marker and a fixed AR marker. A distance to the first moveable AR marker can be determined. Based on the known location of the first moveable AR marker and the distance to the first moveable AR marker from the computing device, an estimate of the location of the computing device can be determined without having line-of-sight (LOS) to the fixed AR marker.

20 Claims, 11 Drawing Sheets

400

600

800

USING AUGMENTED REALITY MARKERS FOR LOCAL POSITIONING IN A COMPUTING ENVIRONMENT

CROSS-REFERENCE TO RELATED APPLICATIONS

This application is a continuation of U.S. patent application Ser. No. 16/546,286, entitled "USING AUGMENTED REALITY MARKERS FOR LOCAL POSITIONING IN A COMPUTING ENVIRONMENT" filed on Aug. 20, 2019. The contents of the aforementioned application is incorporated herein by reference in its entirety.

RELATED APPLICATION

This application is related to the United States patent application titled "USING THREE-DIMENSIONAL AUGMENTED REALITY MARKERS FOR LOCAL GEO-POSITIONING IN A COMPUTING ENVIRONMENT," Ser. No. 16/546,282, filed on Aug. 20, 2019, which is hereby incorporated by reference in its entirety.

TECHNICAL FIELD

Embodiments described herein generally relate to geo-positioning.

BACKGROUND

The Global Positioning System (GPS) is often used to provide geo-positioning. When GPS is not available, for example, for many indoor spaces, other conventional location determination systems are employed. These conventional location determination systems often require wireless network connectivity or rely on beacons. However, many spaces that prevent the use of GPS do not provide wireless network connectivity. Additionally, beacon-based location systems require many intricate and costly beacons that are often arranged in a customized manner for a particular space and require complex maintenance. Accordingly, what is needed is a reliable geo-positioning determination system that can determine a user's location and provide navigation services that does not involve beacons and does not necessarily rely on network connectivity.

SUMMARY OF THE DISCLOSURE

This disclosure presents various systems, components, and methods related to providing geo-positioning. Each of the systems, components, and methods disclosed herein provides one or more advantages over conventional systems, components, and methods.

Various embodiments include techniques for providing local geo-positioning using physical three-dimensional (3D) augmented reality (AR) markers. A 3D AR marker located within an occupied space of a user can be displayed on a display of a computing device when the AR marker is within a field of view of the computing device. The 3D AR marker can be identified based on information stored in a storage device of the computing device. Physical attribute information of the 3D AR marker and location information for the 3D AR marker can be retrieved. A distance between the computing device and the 3D AR marker can be determined based on the physical attribute information. A location of the computing device can then be determined based on the determined distance between the computing device and the 3D AR marker and the location information of the 3D AR marker. The computing device can then provide navigation services to the user based on the determined location of the computing device.

3D AR markers can be any physical 3D object. As a result, geo-positioning can be provided without the need for complex and expensive beacons. Further, geo-positioning can be provided without altering a desired space.

Various embodiments include techniques for providing indirect local geo-positioning using AR markers. A first moveable AR marker can be located or found by a computing device. A location of the first moveable AR marker can be known and shared with the computing device. The location of the first moveable AR marker can be based on distance between the first moveable AR marker and a fixed AR marker. A distance to the first moveable AR marker can be determined. Based on the known location of the first moveable AR marker and the distance to the first moveable AR marker from the computing device, an estimate of the location of the computing device can be determined without having line-of-sight (LOS) to the fixed AR marker, thereby providing indirect position determination for the computing device.

Reliable local positioning of a device or corresponding user of the device can be determined indirectly without having LOS to a fixed AR marker, thereby allowing devices/users to find one another or receive navigation services when positioned away from a fixed location anchor/fixed AR marker.

Various embodiments include techniques for associating AR content to moveable objects. A first computing device associated with a moving object can determine its position relative to a fixed AR marker. The determined location of the first computing device can be transmitted to a remote computing system. A second computing device can determine its location relative to the fixed AR marker. The second computing device can receive the determined location of the first computing device from the remote computing system. The second computing device can determine a confirmed location of the first computing device relative to the second computing device based on the determined location of the second computing device and the reported location of the first computing device. After determining the confirmed location of the first computing device relative to the second computing device, the second computing device can generate and display AR content for the first computing device on a display when the first computing device is positioned within a field of view of the second computing device. The AR content and first computing device can therefore be displayed together on a display of the second computing device.

Attaching AR content to a moveable object enables a user of a computing device to more efficiently locate an individual or other moving object within a large crowded space such as a shopping mall, music festival, or parking lot. The AR content can provide information regarding the moving object and/or can provide navigation to the user to guide the user to the moving object. Other embodiments are also disclosed and described.

DETAILED DESCRIPTION

Figure 1:
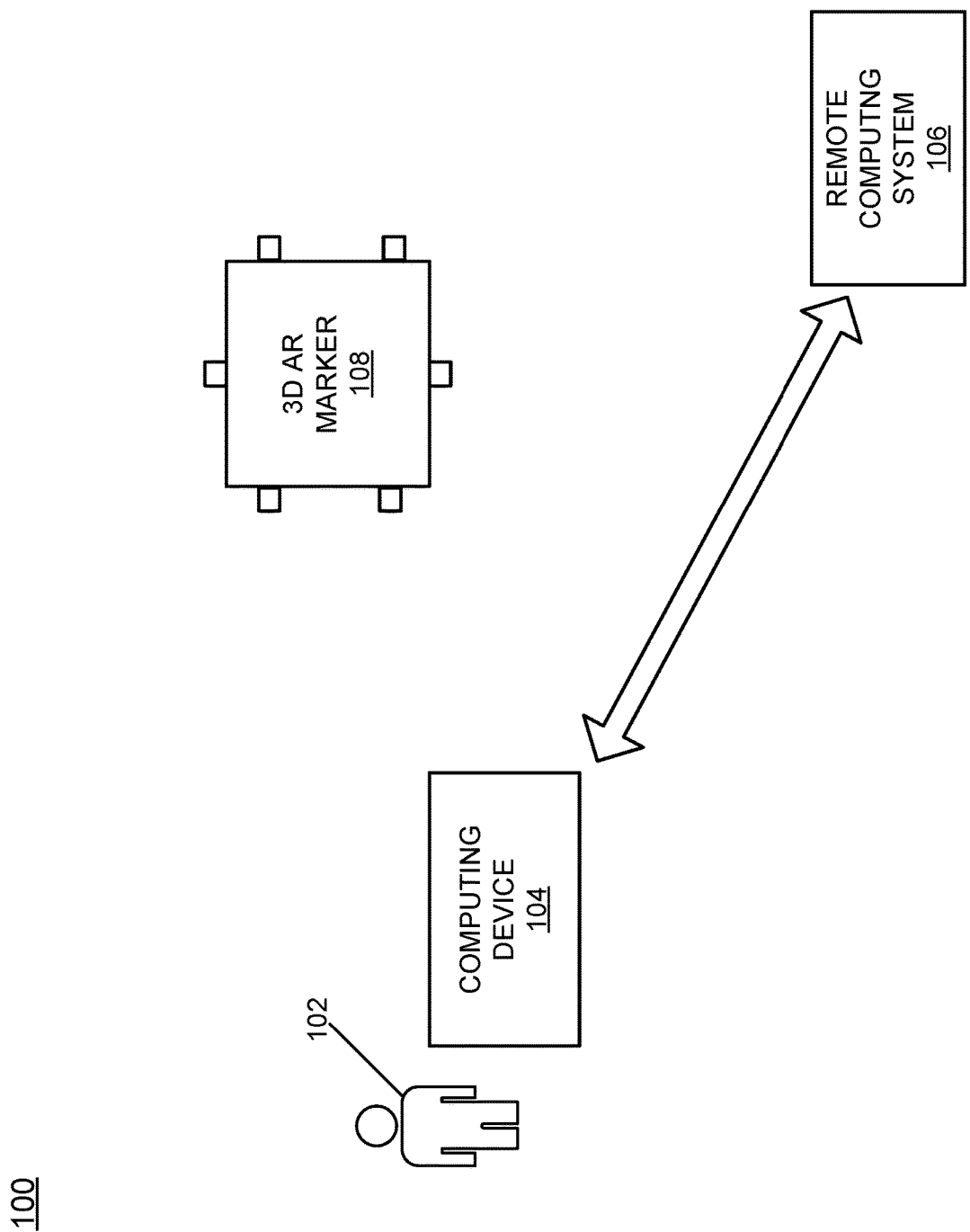
FIG. 1 illustrates a first operating environment.

FIG. 1 illustrates an operating environment 100 such as may be representative of various embodiments in which techniques for determining local geo-positioning using three-dimensional (3D) augmented reality (AR) markers are provided. As shown in FIG. 1, the operating environment 100 can include a user 102, a computing device 104, a remote computing system 106, and a 3D AR marker 108.

The operating environment 100 can be any space occupied by the user 102 such as, for example, an indoor space or an outdoor space. In various embodiments, the operating environment 100 can be a building such as for example, an office space, a hotel, a convention center, or a warehouse. In various embodiments, a global positioning system (GPS) is not available within the operating environment 100. In various embodiments, a wireless network such as, for example, any local area network (LAN), any wide area network (WAN), or any cellular network is not available within the operating environment 100 such that wireless transmission or reception of data is not available. In various embodiments, one or more wireless networks may be available in the operating environment 100 such that wireless transmission or reception of data is available.

The computing device 104 can be a local computing device (e.g., relative to the user 102) and can include any type of electronic computing device such as, for example, a desktop, a laptop, a tablet, a notebook, a mobile device, or electronic eyewear. In general, the computing device 104 can be any computing device capable of viewing 3D objects within the operating environment 100. Accordingly, in various embodiments, the computing device 104 can be any electronic device that includes an optical system (e.g., a camera) for receiving optical information (e.g., visual information about a 3D object within the operating environment 100). Further, in various embodiments, the computing device 104 can include a display system (e.g., a monitor, a display, a touchscreen, etc.) for rendering visual information (e.g., a 3D object within the operating environment 100 viewed by the optical system). Additionally, in various embodiments, the computing device 104 can generate and display AR components or information on any display system provided by the computing device 104.

The remote (relative to the user 102) computing system 106 can be any type of computing device including a server or can represent a computer network, a cloud-based computing system, a database, or any other computer networking component and/or electronic computing device or storage device. The remote computing system 106 can communicate with the computing device 104 over any communication medium based on any known communication protocol or standard including, for example, any known wireless LAN standard or protocol.

The 3D AR marker 108 can be any physical 3D object such as, for example, a chair, a vase, or a lamp. The 3D AR marker 108 can have any height or size and can represent or operate as a location anchor. That is, in various embodiments, the location of the 3D AR marker 108 can be known and can be used as a reference point for determining a location of the user 102 and/or the computing device 104. In various embodiments, the 3D AR marker 108 can be of sufficient detail to be distinguished from any other physical 3D object.

In various embodiments, a layout of the operating environment 100 can be pre-stored and/or known to the computing device 104. For example, the layout of the operating environment 100 (e.g., an architectural layout or map of the operating environment 100) can be stored in a memory component of the computing device 104. In various embodiments, the layout of the operating environment 100 can be provided to the computing device 104 from the remote computing system 106.

In various embodiments, information regarding the 3D AR marker 108 can be pre-stored and/or known to the computing device 104. In various embodiments, information regarding the 3D AR marker 108 can be provided to the computing device 104 from the remote computing system 106. Information regarding the 3D AR marker 108 can include, for example, a location of the 3D AR marker 108 or any physical attribute of the 3D AR marker 108. The location of the 3D AR marker 108 can include an absolute geo-position of the 3D AR marker 108 (e.g., including a latitude and a longitude or a GPS position) or can include a position relative to any feature within or relative to any portion of the operating environment 100. Physical attributes of the 3D AR marker 108 can include any dimensional information regarding the 3D AR marker 108 (e.g., a height, width, size, shape, profile, etc.). Physical attributes of the 3D AR marker 108 can also include information regarding any color, pattern, or physical feature of the 3D AR marker 108. In various embodiments, the 3D AR marker 108 can be flagged or labeled as operating as a location anchor (e.g., a sign can be placed on the 3D AR marker 108).

In various embodiments, a location of the user 102 and/or the computing device 104 can be unknown. The location of the user 102 and the computing device 104 are used interchangeably herein without intent to limit as the user 102 is generally in close proximity to the computing device 104—for example, the user 102 may either be holding or wearing the computing device 104. To determine the location of the user 102/computing device 104, the 3D AR marker 108 can first be located—i.e., found or viewed through the computing device 104 (e.g., within a field of view of an optical system of the computing device 104). Once the 3D AR marker 108 is found, an exact location of the 3D AR marker can be determined. Based on attributes of the 3D AR marker 108, a distance from the user 102 to the 3D AR marker 108 can be determined. Based on the determined distance to the 3D AR marker 108 having a known location, an exact location of the user 102 can be determined. The exact location of the user 102 can include an absolute geo-position of the user 102 (e.g., including a latitude and a longitude or a GPS position) or can include a position relative to any feature within or relative to any portion of the operating environment 100. After determining the location of the user 102, the computing device 104 can route the user 102 to a desired location within the operating environment 100 (e.g., to a meeting room within a hotel) or can route another individual within the operating environment 100 to the user 102 (e.g., to enable an acquaintance to find the user 102).

In various embodiments, once the location of the user 102 is determined, the computing device 104 can provide any type of visual information (e.g., graphical and/or textual information) on a display to navigate the user 102 to a desired location. As an example, the computing device 104 can provide an arrow (e.g., an AR indicator) on the display pointing to a direction of travel to initiate navigation toward a desired location. As another example, the computing device 104 can provide a map of the operating environment 100 with an indication on the map of where the user 102 is located, where the desired location is positioned, and/or a route (visual and/or textual) for reaching the desired location. The computing device 104 can determine the location of the 3D AR marker 108, can determine the location of the user 102 in reference to the 3D AR marker 108, and can route the user 102 to any other desired location within the operating environment 100 in a variety of manners as described herein.

In various embodiments, as the user 102 wanders or moves around the operating environment 100, the user 102 can observe the operating environment 100 and objects within the operating environment 100 through a display system of the computing device 104. The display system of the computing device 104 can provide a visual rendering of any viewed object within the operating environment 100. In doing so, the display system of the computing device 104 can display the 3D AR marker 108 when the 3D AR marker 108 is within a field of view of the optical system of the computing device 104.

In various embodiments, the user 102 may be aware of what objects in the operating environment 100 may be designated as or may operate as location anchors. For example, the user 102 may be aware that the 3D AR marker 108 is indeed a 3D AR marker/location anchor. In various other embodiments, the user 102 may not be aware as such. Accordingly, the computing device 104 may use object detection or some other object or feature recognition technique to identify the 3D AR marker 108. For example, the viewed 3D AR marker 108 can be compared to one or more stored AR markers to determine if the viewed 3D AR marker 108 matches a known AR marker. The comparison can be made based on one or more physical attributes between the viewed 3D AR marker 108 and the one or more stored AR markers.

Under either scenario, the 3D AR marker 108 can be identified within the operating environment 100—either automatically by the computing device 104 (e.g., by automatic visual detection) or by the user 102. If the user 102 identifies the 3D AR marker 108, then the user 102 can indicate to the computing device 104 that the 3D AR marker 108 has been identified (e.g., by providing such an indication when the 3D AR marker 108 is within the field of view of the computing device 104). For example, the user 102 can indicate through a user interface of the computing device 104 (e.g., a voice or touch-based user interface) that a viewed object is a 3D AR marker. In various embodiments, the 3D AR marker 108 can be viewed on a display of the computing device 104 and the user 102 can touch the rendering of the 3D AR marker 108 on a touchscreen to indicate the rendered object is an AR marker.

After identifying the 3D AR marker 108, physical attribute information and/or location information regarding the 3D AR marker 108 can be retrieved—for example, either from local memory storage of the computing device 104 or from the remote computing system 106.

The attribute information regarding the 3D AR marker 108 can be used to determine a distance from the user 102 to the 3D AR marker 108. For example, one or more features of the 3D AR marker 108 can be used to determine a rotational position of the user 102 relative to the one or more features and/or a distance to the 3D AR marker 108 can be determined. After determining a position of the user 102 relative to the 3D AR marker 108, an exact location of the user 102 can be determined based on the known exact location of the 3D AR marker 108.

In various embodiments, when the computing device 104 provides an AR framework (e.g., an ability to view 3D objects within the operating environment 100) and identifies the 3D AR marker 108 in its field of view, the computing device 104 can determine a size and a rotation of 3D AR marker 108. Given information regarding physical attributes of the 3D AR marker 108, the distance to the 3D AR marker 108 can be determined. A variety of factors can be used to do so that can vary based on the distance determination technique employed and can include, for example, an angle of rotation from the 3D AR marker 108, a size difference between the perceived size of the 3D AR marker 108 and the actual size of the 3D AR marker 108, a degree of rotation of the computing device 104, a height or altitude of the computing device 104, etc.

Information can then be provided to the user 102 through the computing device 104 to route the user 102 to a desired location as indicated by the user. For example, the display system of the computing device 104 can display a virtual icon, mark, or other graphical feature that indicates a direction of travel towards the desired destination based on the determined location of the user 102. In this way, a user 102 can locate any space, room, object, or individual located in the operating environment 100 that has a known location. Further, the displayed indicator can be updated (e.g., a virtual arrow can be rotated) to dynamically update an indicated direction of travel to reach the desired destination as the user 102 traverses a route to the desired destination. Alternatively, another individual can be guided to the user 102.

In various embodiments, features of the 3D AR marker 108—for example, physical attributes of the 3D AR marker 108—can be pre-scanned or pre-planned and stored and made available to the computing device 104 (e.g., stored in a memory component of the computing device 104).

In various embodiments, the computing device 104 can include a gyroscope, an accelerometer, or another device to detect changes in position, rotation, and/or height of the computing device 104 to facilitate determination of a distance between the user 102/computing device 104 and the 3D AR marker 108. In various embodiments, the computing device 104 can include an infrared sensor or other sensor to determine a distance between the user 102/computing device 104 and the 3D AR marker 108. In various embodiments, a gyroscope and/or accelerometer could facilitate determining orientation of a camera of the computing device 104 while looking at the AR marker 108, or could also be used to track a position of the computing device 104 if the camera loses sight of all AR markers.

The techniques disclosed herein for providing local geopositioning using 3D AR markers enables the user 102 to orient a user's device (e.g., the computing device 104). The techniques disclosed herein enable pre-positioned 3D AR markers to orient the user 102 in situations where GPS or other positioning mechanisms or technologies are not available.

The techniques disclosed herein provide numerous advantages over using conventional location beacons. First, conventional location beacons require a power source and are often battery powered. Second, an indoor positioning system that relies on conventional location beacons typically requires a complex mesh of beacons placed at equal distance intervals. In turn, such a system is often required to be custom built to fit a particular building. As such, a mesh system of conventional location beacons is expensive to design, build, and maintain.

In contrast, the techniques disclosed herein can leverage any existing 3D object to be a 3D AR marker. The 3D AR markers do not require a power source and can serve other roles within a building space (e.g., as furniture, artwork, any object already existing in the space, etc.). As a result, the techniques disclosed herein significantly reduce both a complexity and the cost of providing a location system.

Figure 2:
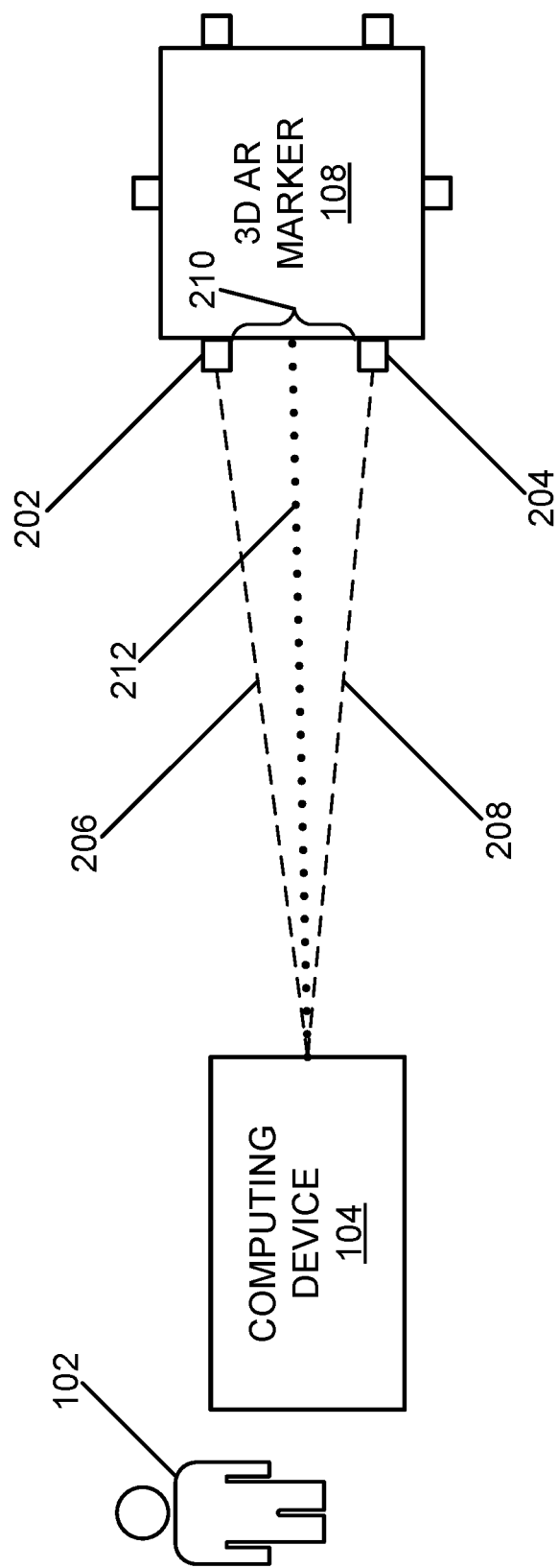
FIG. 2 illustrates an overview of a first technique for determining a distance between a computing device and a three-dimensional (3D) augmented reality (AR) marker depicted in FIG. 1.

FIG. 2 illustrates an overview of a first technique for determining a distance between the computing device 104 and the 3D AR marker 108. As shown in FIG. 2, the 3D AR marker 108 can include a first feature object or point 202 and a second feature object or point 204. The optical system of the computing device 104 can view the first feature point 202 through a first line of sight (LOS) 206 and can view the second feature point through a second LOS 208. A distance 210 between the first and second feature points 202 and 204 can be known—for example, stored in a memory component of the computing device 104. Based on viewing the first and second feature points 202 and 204 through the first and second LOS s 206 and 208, respectively, and based on the distance 210, a distance 212 between the computing device 104 (and by proxy the user 102) and the 3D AR marker 108 can be determined by techniques such as photogrammetry, or minimization of a least-squares distance between salient feature points in an image and salient feature points in a representation such as a CAD model of the 3D AR marker 108, or using a machine learning model to predict distance and orientation relative to the 3D AR marker 108, or other techniques as will be appreciated by one of ordinary skill in the relevant art. Further, the distance 212 can be determined based on additional information as disclosed herein including a known height, shape, or size of the 3D AR marker 108, differences in the actual size of the 3D AR marker 108 and the size of the 3D AR marker 108 when viewed through the computing device 104, a height and/or rotation of the computing device 104, a known field of view or resolution of the camera of computing device 104, a defined field of view or resolution of the camera of computing device 104, and/or other factors as will be appreciated by one of ordinary skill in the relevant art.

Figure 3:
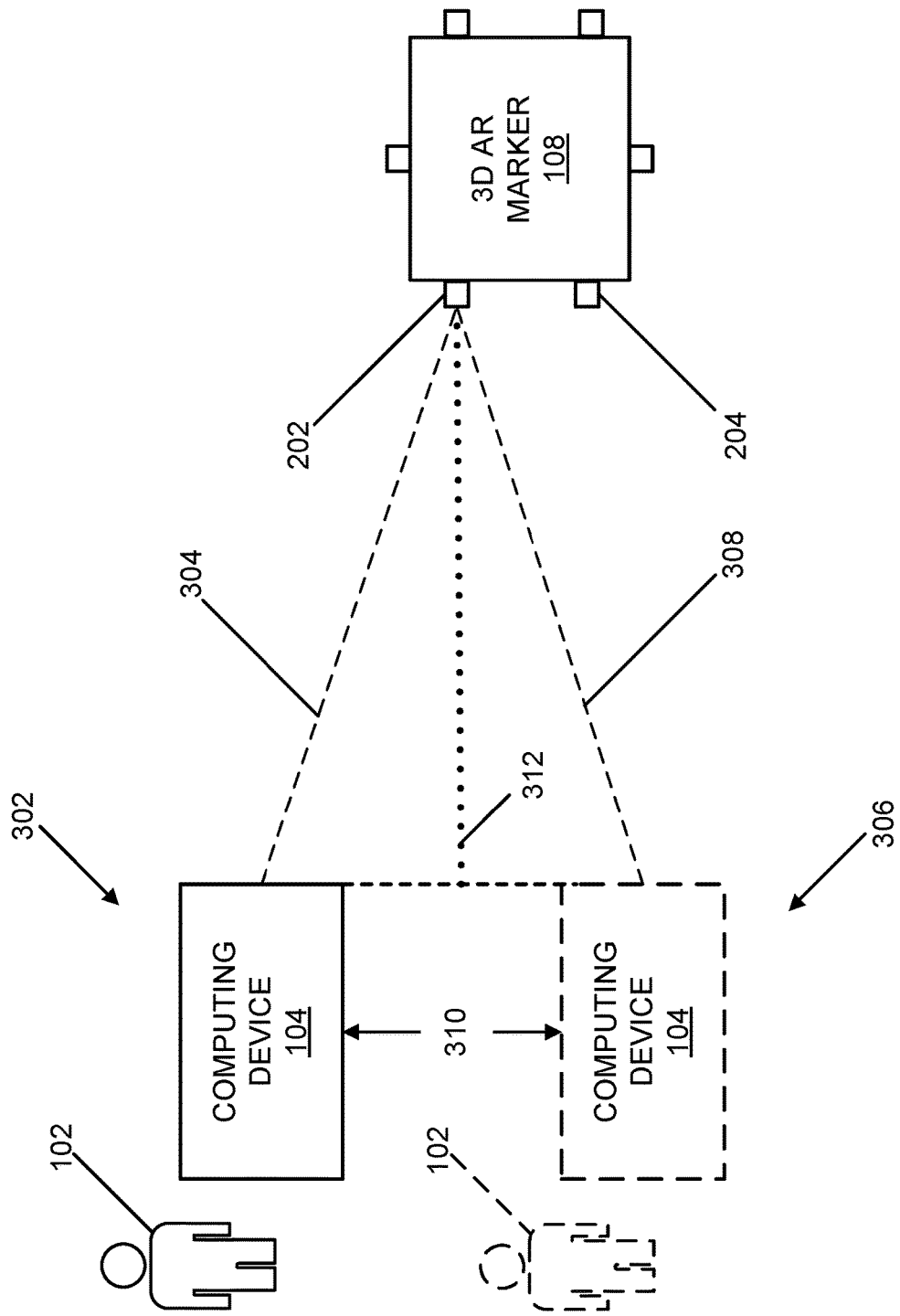
FIG. 3 illustrates an overview of a second technique for determining a distance between the computing device and the 3D AR marker depicted in FIG. 1.

FIG. 3 illustrates an overview of a second technique for determining a distance between the computing device 104 and the 3D AR marker 108. As shown in FIG. 3, the computing device 104 can view the first feature point 202 at a first location 302 through a first LOS 304 and can view the first feature point 202 at a second location 306 through a second LOS 308 (with the computing device 104 and the user 102 each shown in phantom at the second location 306). A distance 310 between the first and second locations 302 and 306 can be known—for example, stored in a memory component of the computing device 104. Based on viewing the first feature point 202 through the first and second LOSs 304 and 308 at the first and second locations 302 and 306, respectively, and based on the distance 310, a distance 312 between the computing device 104 (and by proxy the user 102) and the 3D AR marker 108 can be determined as will be appreciated by one of ordinary skill in the relevant art. The distance 312 can be from the 3D AR marker 108 to a point between the first and second locations 302 and 306. Further, the distance 312 can be determined based on additional information as disclosed herein including a known height, shape, or size of the 3D AR marker 108, differences in the actual size of the 3D AR marker 108 and the size of the 3D AR marker 108 when viewed through the computing device 104, a height and/or rotation of the computing device 104, and other factors as will be appreciated by one of ordinary skill in the relevant art.

Figure 4:
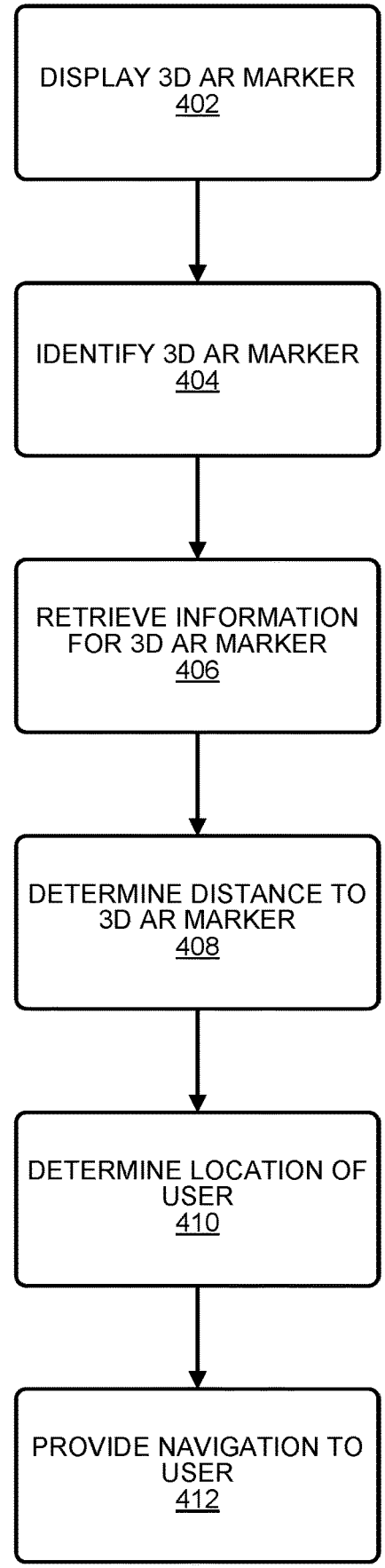
FIG. 4 illustrates a first logic flow.

FIG. 4 illustrates an example of a logic flow 400 that may be representative of techniques for providing local geo-positioning using 3D AR markers. For example, the logic flow 400 may be representative of operations that may be performed in various embodiments by any constituent component of the operating environment 100 (e.g., the computing device 104) depicted in FIG. 1.

At 402, a 3D AR marker located within an occupied space of a user can be displayed on a display of a computing device when the AR marker is within a field of view of the computing device.

At 404, the 3D AR marker can be identified and/or recognized. The 3D AR marker can be recognized based on a label or other visual indicator outside of the 3D AR marker itself—for example, by a sign on or near the 3D AR marker indicating it is a 3D AR marker and/or through an indication provided by a user. The 3D AR marker can also be recognized automatically by visual detection techniques implemented by the computing device based on information stored in a storage device of the computing device 104. For example, known features of a stored 3D AR marker can be compared to an object within the field of the view of the computing device 104. Based on a comparison between the viewed object and the stored information, a determination can be made that the viewed 3D object is a designated 3D AR marker.

At 406, physical attribute information for the 3D AR marker can be retrieved. The physical attribute information can be stored locally in the storage device of the computing device 104 or can be received from a remote computing system (e.g., the remote computing system 106). Location information for the 3D AR marker can also be retrieved. The location information can be stored locally in the storage device of the computing device 104 or can be received from a remote computing system (e.g., the remote computing system 106). The location information can be any location information for precisely placing the 3D AR marker such as latitude and longitude information, or location information relative to a space occupied by the 3D AR marker (e.g., relative to a building in which the 3D AR marker is positioned).

At 408, a distance between the computing device and the 3D AR marker can be determined based on the physical attribute information of the 3D AR marker. As disclosed herein, a variety of distance determination techniques can be used to determine this distance as will be appreciated by one of ordinary skill in the relevant art.

At 410, a location of the computing device and/or user of the computing device can be determined based on the determined distance between the computing device and the AR marker and the location information of the AR marker.

At 412, the location of the computing device and/or the user of the computing device can be used to guide or navigate the user. For example, the location of the computing device and/or the user of the computing device can be used to route or direct the user to a desired location or can be used to route or direct another individual to the user. In various embodiments, as described herein, the logic flow 400 and/or the techniques for providing local geo-positioning using 3D AR markers described herein can be provided without any available wireless or wired network. In various embodiments, once the location of the computing device and/or the user of the computing device is determined, this location information can be distributed or provided to other computing devices or computing systems.

In various embodiments, the computing device 104 and/or the user 102 of the computing device 104 may operate as a moveable AR marker, enabling other devices and/or users that do not have a direct LOS to the fixed AR marker 108 to determine a position or location based on position information of the computing device 104 and/or the user 102.

Figure 5:
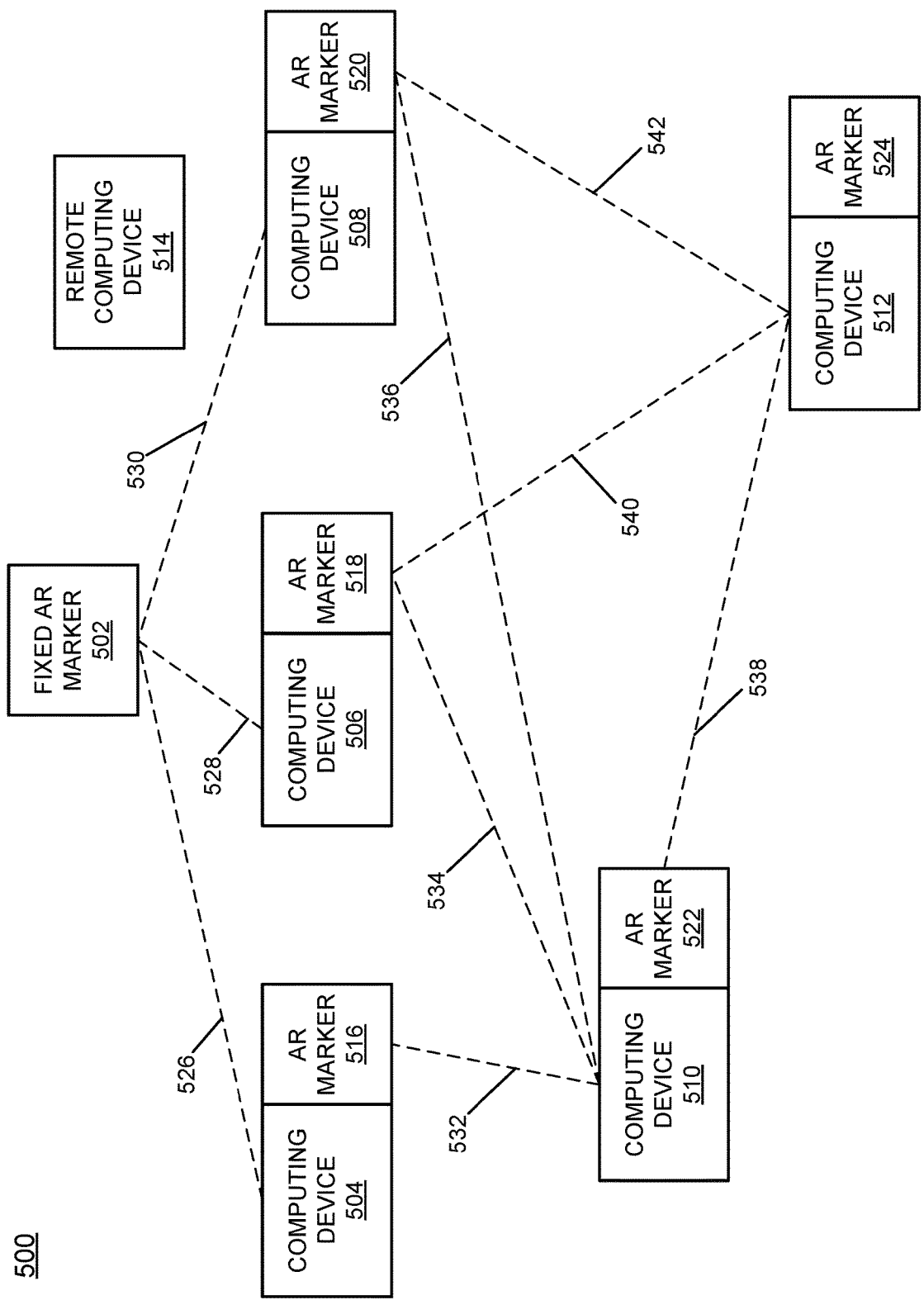
FIG. 5 illustrates a second operating environment.

FIG. 5 illustrates an operating environment 500 such as may be representative of various embodiments in which techniques for determining indirect local positioning using one or more moveable AR markers are provided. As shown in FIG. 5, the operating environment 500 can include a fixed AR marker 502, a first computing device 504, a second computing device 506, a third computing device 508, a fourth computing device 510, a fifth computing device 512, a user 102, a computing device 104, a remote computing system 514, a first moveable AR marker 516, a second moveable AR marker 518, a third moveable AR marker 520, a fourth moveable AR marker 522, and a fifth moveable AR marker 524.

The fixed AR marker 502 may be any fixed position AR marker 502. The fixed AR marker 502 can be a two-dimensional (2D) or a 3D AR marker. In various embodiments, the fixed AR marker 502 can represent the 3D AR marker 108.

Each of the computing devices 504-512 can be any type of computing device and can represent an instance or implementation of the computing device 104. Each of the computing devices 504-512 can be mobile devices. The remote computing system 514 can be any type of remote computing system and can represent the remote computing system 106.

Each of the moveable AR markers 516-522 can be any type of AR marker. In various embodiments, each of the moveable AR markers 516-522 can be a 2D or a 3D marker. As an example, the moveable AR markers 516-522 can be a QR code. The moveable AR markers 516-522, in contrast to the fixed AR marker 502, can be moved. The moveable AR markers 516-522 are each associated with a corresponding computing device 504-512 as shown in FIG. 5. Specifically, the moveable AR marker 516 is associated with the computing device 504, the moveable AR marker 518 is associated with the computing device 506, the moveable AR marker 520 is associated with the computing device 508, the moveable AR marker 522 is associated with the computing device 510, and the moveable AR marker 524 is associated with the computing device 512. The moveable AR markers 516-524 can be attached to the corresponding computing devices 504-512, can be a part of the corresponding computing devices 504-512, can be worn by a user of the corresponding computing devices 504-512, or can otherwise be closely coupled to and/or associated with the corresponding computing devices 504-512. In various embodiments, the moveable AR markers 516-524 can be an object worn or attached to the users of the corresponding computing devices 504-512 such as, for example, a hat, shirt, etc. worn by the users and having an AR marker thereon.

The operating environment 500 can be any space such as, for example, an indoor space or an outdoor space. In various embodiments, the operating environment 500 can represent the operating environment 100. In various embodiments, a global positioning system (GPS) is not available within the operating environment 500. In various embodiments, a wireless network such as, for example, any local area network (LAN), any wide area network (WAN), or any cellular network is available within the operating environment 500 such that wireless transmission or reception of data is available. In various embodiments, each of the computing devices 504-512 can be wirelessly connected to the remote computing system 514 such that any depicted computing device 504-512 and the remote computing system 514 can transmit and receive data among one another.

In various embodiments, the computing device 504 can determine its local position based on the fixed AR marker 502 based on techniques described herein (e.g., based on techniques described in relation to FIGS. 1-4). For example, the computing device 504 can determine a distance 526 to the fixed AR marker 502 and then, based on a known position of the fixed AR marker 502 and the determined distance 526, can determine a position or location of the computing device 504. Similarly, the computing device 506 can determine a distance 528 and the computing device 508 can determine a distance 530 to the fixed AR marker 502 that can be similarly used to determine a position or location of the computing devices 506 and 508, respectively.

In various embodiments, the known position or location of the fixed AR marker 502 can be stored by each of the computing devices 504-508 and/or can be provided to the computing devices 504-508 from the remote computing system 514. Further, in various embodiments, a determined location or position of the computing device 504 can be considered to correspond or to be the location or position of the corresponding moveable AR marker 516 since the computing device 504 and the moveable AR marker 516 are generally in close proximity to one another. Similarly, the determined location or position of the computing device 506 can be considered to be the location or position of the corresponding moveable AR marker 518 and the determined location or position of the computing device 508 can be considered to be the location or position of the corresponding moveable AR marker 520.

In various embodiments, the determined positions or locations of any of the computing devices 504-508 can be transmitted to the remote computing system 514. The remote computing system 514 can store the provided location information and can distribute the location information to any other device or user within the operating environment 500.

In various embodiments, the computing device 510 may not have a LOS to the fixed AR marker 502. Accordingly, the computing device 510 may not be able to determine its position directly from interacting with the fixed AR marker 502. In accordance with various techniques described herein, the computing device 510 can determine its position or location based on interaction with one or more of the computing devices 504-508 and the known locations of the computing devices 504-508 (or, interchangeably, the known locations of the corresponding AR markers 516-520). In this manner, the position of the computing device 510 can be determined indirectly based on the fixed AR marker 502 through position data of one or more of the computing devices 504-508 provided through the remote computing system 514.

In various embodiments, the computing device 510 may have a LOS with the moveable AR marker 516. The computing device 510 can use information regarding the moveable AR marker 516 to determine a distance 532 to the movable AR marker 516. The information regarding the moveable AR marker 516 can include physical attribute information regarding the moveable AR marker 516 and location information regarding the moveable AR marker 516. Such information can be provided to the computing device 510 from the remote computing system 514. The computing device 510 can then determine its position relative to the known position of the moveable AR marker 516, which in turn can be based on the known position of the fixed AR marker 502. The computing device 510 can determine its local position based on the moveable AR marker 516 based on techniques described herein (e.g., based on techniques described in relation to FIGS. 1-4). In this manner, a location or position of the computing device 510 can be determined indirectly from the position of the fixed AR marker 502, through use of a moveable AR marker 516 coupled to the computing device 504.

In a similar manner, the computing device 510 can use information regarding the moveable AR marker 518 to determine a distance 534 between the moveable AR marker 518 and the computing device 510 and can use information regarding the moveable AR marker 510 to determine a distance 536 between the moveable AR marker 520 and the computing device 510. In this way, the determined distance 532 and the known location of the moveable AR marker 516 can be used by the computing device 510 to determine a first estimated location of the computing device 510; the determined distance 534 and the known location of the moveable AR marker 518 can be used by the computing device 510 to determine a second estimated location of the computing device 510; and the determined distance 536 and the known location of the moveable AR marker 520 can be used by the computing device 510 to determine a third estimated location of the computing device 510.

Any of the first, second, or third estimated locations of the computing device 510 can be transmitted or reported to the remote computing system 514. In various embodiments, the computing device 510 can determine a modified estimated location based on two or more of the first, second, or third estimated locations of the computing device 510. For example, the computing device 510 can determine a modified estimated position based on averaging the first estimated location based on the moveable AR marker 516 and the second estimated location based on the moveable AR marker 518. In general, any number of estimated locations based on corresponding moveable AR markers can be used to generate an average or modified estimate of the position of the computing device 510 (for example, including a weighted average of certain estimates). Alternatively, the estimate location can be based on a single moveable AR marker.

In various embodiments, once one of the computing devices 504-508 determines its location (e.g., relative to the fixed AR marker 502), the computing devices 504-508 can continuously and/or dynamically update its location information by transmitting or reporting any updated location information to the remote computing system 514. In this manner, as the positions of the computing devices 504-508 change, the changing positions can still be used to determine a location of the computing device 510 since the changing positions can be tracked within the operating environment 500 once an initial position is determined. In various embodiments, movement of any of the computing devices 504-508 can be determined by one or more sensors or components such as a gyroscope or accelerometer (e.g., relative to an initially established location). In various embodiments, movement of any of the computing devices 504-508 can be determined by updating (e.g., periodically) determination of the corresponding distances 526-530.

In various embodiments, the computing device 512 can also determine its position or location indirectly in a similar manner as described in relation to the computing device 510. In various embodiments, the computing device 512 can determine its estimated location based on a determined estimated location of the computing device 510. In this manner, the estimated location of the computing device 512 can be based on a location for the computing device 510 that is determined without a LOS to the fixed AR marker 502. In various embodiments, the estimated location of the computing device 512 can be determined without LOS to the fixed AR marker 502 and based on the locations of one or more determined locations (e.g., the location of the computing device 510) that were determined without LOS to the fixed AR marker 502 and/or based on the locations of one or more determined locations (e.g., the computing devices 506 and 508) that were determined with LOS to the fixed AR marker 502.

As an example, in various embodiments, the computing device 512 can determine its local position based on one or more of the moveable AR markers 522, 518, and 520 based on techniques described herein (e.g., based on techniques described in relation to FIGS. 1-4 and/or described above in relation to computing device 510). Specifically, the computing device 512 can determine a distance 538 to the moveable AR marker 522, can determine a distance 540 to the moveable AR marker 518, and can determine a distance 542 to the moveable AR marker 520. The computing device 512 can use any or all of the determined distances 538-542 to estimate a location of the computing device 512 based on the known locations of the moveable AR markers 522, 518, and 520 (e.g., based on the locations of the corresponding computing devices 510, 506, and 508, respectively, as reported to the remote computing system 514 and provided to the computing device 512) and/or based on the location estimate averaging techniques described above.

The techniques for indirectly determining a local position of a device or user as described herein can provide numerous advantages over conventional location determination systems, in situations where GPS is either available or not available (and/or would be less accurate). As an example, the operating environment 100 can be a roadway with a fixed street sign or other object operating as the fixed AR marker 502. The computing devices 504-512 may be part of a vehicle (e.g., a vehicle having an optical system for viewing AR markers) or may operate within a vehicle travelling along the roadway. The computing devices 504-512 may each determine their respective locations based on the fixed AR marker 502 directly (e.g., having LOS to the fixed AR marker 502) or indirectly (not having LOS to the fixed AR marker 502) with an accuracy that may be improved over GPS. Accordingly, in many situations, where GPS is available within the operating environment, the indirect local positioning techniques described herein may provide improved location accuracy. The computing devices 504-512 can then be provided navigation services—for example, routing to desired locations—based on the accurate location determination made available directly or indirectly with the use of the fixed AR marker 502.

As another example, the operating environment 500 may be a larger outdoor music festival venue that does not have GPS available. The computing devices 504-512 can be associated with attendees of the festival and may each hold, carry, wear, or otherwise be associated with corresponding AR markers 516-522 (e.g., the AR markers 516-522 may be a t-shirt or hat having an AR marker on it). A user of the computing device 510 can locate individuals operating computing devices 504-508 without having LOS to the fixed AR marker 502. The fixed AR marker 502 can be any object having a fixed location during the duration of the festival such as, for example, a vending booth, ticket booth, a stage, etc. In this way, festival attendees can locate one another if separated and/or can locate specific locations or booths within the festival in a safe and reliable manner.

Figure 6:
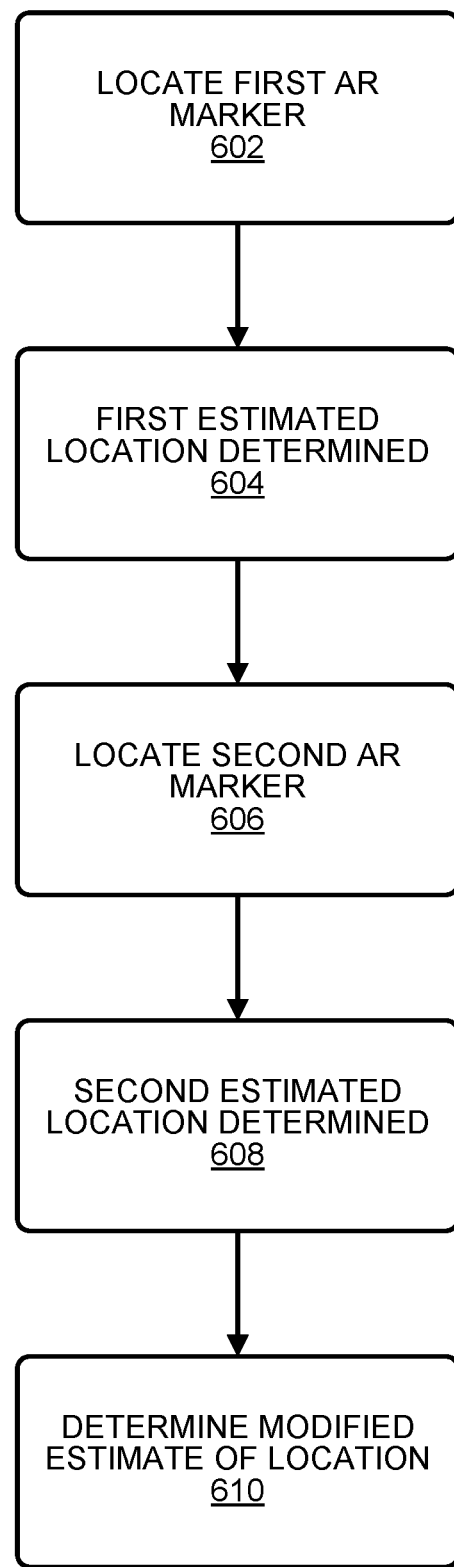
FIG. 6 illustrates a second logic flow.

FIG. 6 illustrates an example of a logic flow 600 that may be representative of techniques for providing indirect local geo-positioning using AR markers. For example, the logic flow 600 may be representative of operations that may be performed in various embodiments by any constituent component of the operating environment 500 (e.g., the computing device 510 or the computing device 512) depicted in FIG. 5.

At 602, the computing device can locate a first AR marker. The first AR marker can be a moveable AR marker. The first AR marker can be associated with a first computing device and/or a first user having a known location. The known location can be provided to the computing device from a remote computer system (e.g., the remote computing system 514). The first AR marker can be known—e.g., labeled or otherwise marked as an AR marker. Alternatively, the first AR marker can be detected visually through imaging techniques as will be appreciated by one of ordinary skill in the art when the first AR marker is positioned within a field of view of the computing device.

At 604, a first estimated location of the computing device can be determined. The first estimated location can be determined based on an estimated distance between the computing device and the first AR marker and/or a known location of the first AR marker. In various embodiments, the location of the first AR marker is itself an estimated location and can be based on LOS to a fixed AR marker (e.g., the AR marker 502). The first estimated location can be determined based on techniques described herein.

At 606, the computing device can locate a second AR marker. The second AR marker can be a moveable AR marker. The second AR marker can be associated with a second computing device and/or a second user having a known location. The known location can be provided to the computing device from the remote computing system. The second AR marker can be known—e.g., labeled or otherwise marked as an AR marker. Alternatively, the second AR marker can be detected visually through imaging techniques as will be appreciated by one of ordinary skill in the art when the second AR marker is positioned within a field of view of the computing device.

At 608, a second estimated location of the computing device can be determined. The second estimated location can be determined based on an estimated distance between the computing device and the second AR marker and/or a known location of the second AR marker. In various embodiments, the location of the second AR marker is itself an estimated location and can be based on LOS to a fixed AR marker and/or can be based on not having a LOS to the fixed AR marker. The second estimated location can be determined based on techniques described herein.

At 610, a modified estimated location of the computing device can be determined. The modified estimated location can be based on the first and second estimated locations. In various embodiments, one or more techniques for averaging the first and second estimated locations (e.g., by averaging, by weighted averaging, etc.) can be used to generate the modified estimated location of the computing device. The modified estimated location can be based on any number of individual estimated locations, with each individual estimated location being determined without LOS to a fixed AR marker (e.g., the AR marker 502).

Figure 7:
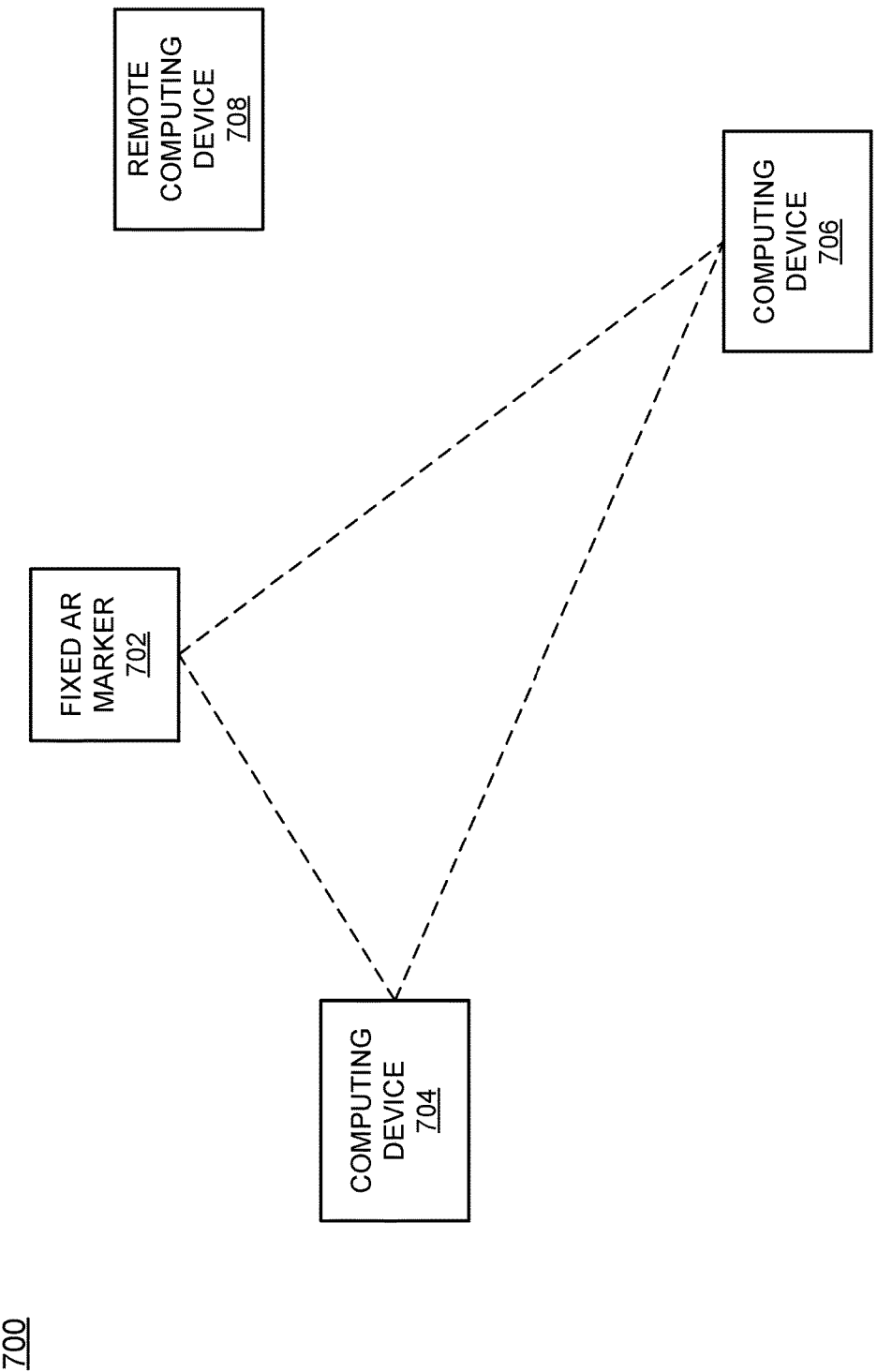
FIG. 7 illustrates a third operating environment.

FIG. 7 illustrates an operating environment 700 such as may be representative of various embodiments in which techniques for associating AR content to moving objects using fixed AR markers are provided. As shown in FIG. 7, the operating environment 500 can include a fixed AR marker 702, a first computing device 704, a second computing device 706, and a remote computing system 708.

The fixed AR marker 502 may be any fixed position AR marker 502. The fixed AR marker 502 can be a two-dimensional (2D) or a 3D AR marker. In various embodiments, the fixed AR marker 502 can represent the 3D AR marker 108.

The computing devices 704 and 706 can be any type of computing device and can each represent an instance of the computing device 104. In various embodiments, the computing devices 704 and 706 can be mobile or moveable devices and/or can be part of a mobile or moveable device. For example, the computing device 704 can be associated with a moveable device such as a vehicle such that the computing device 704 is a part or component of the vehicle or is contained or held within the vehicle. As a further example, the computing device 706 can be a handheld computing device operated by a user. The remote computing system 708 can be any type of remote computing system and can represent the remote computing system 106.

The operating environment 700 can be any space such as, for example, an indoor space or an outdoor space. In various embodiments, the operating environment 700 can represent the operating environment 100. In various embodiments, a global positioning system (GPS) is not available within the operating environment 700. In various embodiments, a wireless network such as, for example, any local area network (LAN), any wide area network (WAN), or any cellular network is available within the operating environment 700 such that wireless transmission or reception of data is available. In various embodiments, the computing devices 704 and 706 can be wirelessly connected to the remote computing system 708 such that the computing devices 704 and 706 can be wirelessly connected to the remote computing system 708 and can transmit and receive data among one another.

In various embodiments, the computing device 704 can determine its position relative to the fixed AR marker 702—for example, according to any of the techniques described herein and/or will be appreciated by one of ordinary skill in the relevant art. After determining its position, the computing device 704 can transmit or report its determined location to the remote computing system 708. The remote computing system 708 can then provide the reported position of the computing device 704 to the computing device 706.

The computing device 706 can similarly determine its position relative to the fixed AR marker 704. The computing device 706 can then determine a confirmed location of the computing device 704 based on the reported location of the computing device 704 (e.g., as received from the remote computing system 708) and the determined location of computing device 706. Once the confirmed location of the computing device 704 is determined, the computing device 706 can display AR content on a display of the computing device associated with the computing device 704 when the computing device 704 is within a field of view of an optical system (e.g., camera) of the computing device 706.

As an example, the computing device 704 can be coupled to a race car that traverses a race track at a high rate of speed. The computing device 706 can be a handheld device operated by a spectator sitting in spectator stands adjacent to the race track. The fixed AR marker 702 can be a scoreboard or video screen located adjacent to the race track and the spectator stands. The computing devices 704 and 706 can each have a LOS to the fixed AR marker 702. The computing devices 704 and 706 can each continuously and/or automatically determine their respective locations within the operating environment 700 based on the fixed AR marker 702 and can continuously and/or automatically report their respective positions to the remote computing system 708. Dynamic updating of the locations of the computing devices 704 and 706 can be shared with any device communicatively coupled to the remote computing system 708. As a result, the computing device 706 can be continuously made aware of the location of the computing device 704. A user of the computing device 706 can then position the race car containing the computing device 704 into its field of view. Based on location information for the computing devices 704 and 706, the computing device 706 can determine a location or the position the race car containing the computing device 704 relative to the location of the computing device 706. The computing device 706 can then generate and display AR content on the display of the computing device 706 that is associated with the race car containing the computing device 704.

The generated and displayed AR content can include any type of content such as, for example, graphical, textual, and/or numerical content. The AR content can be generated based on any information related to the computing device 704. As an example, information regarding the race car containing the computing device 704 (e.g., a name of the driver, current place within the race, etc.) can be used to generate any displayed AR content. The AR content can be displayed on the display of the computing device 706 adjacent to the display of the race car containing the computing device 704. In general, any information provided by the computing device 704 and/or stored or provided by the remote computing system 708 can be used to generate any AR content. The generated AR content can be generated and displayed in real-time as the location of the computing device 704 changes.

The techniques for associating AR content to moving objects as disclosed herein can provide numerous advantages. For example, in large, crowded spaces such as a music festival, car dealership, or shopping mall, a user of the computing device 706 can efficiently locate and find a desired moveable object—such as another person or a vehicle—in environments where GPS may not be available or may not provide accurate location determinations. In various embodiments, another spectator can operate a computing device that can receive position/location information for the computing devices 704 and 706 from the remote computing system 708. The computing device of the additional spectator can then provide its determined location to the remote computing system 708 and/or can project its own AR content onto the computing device 704.

Figure 8:
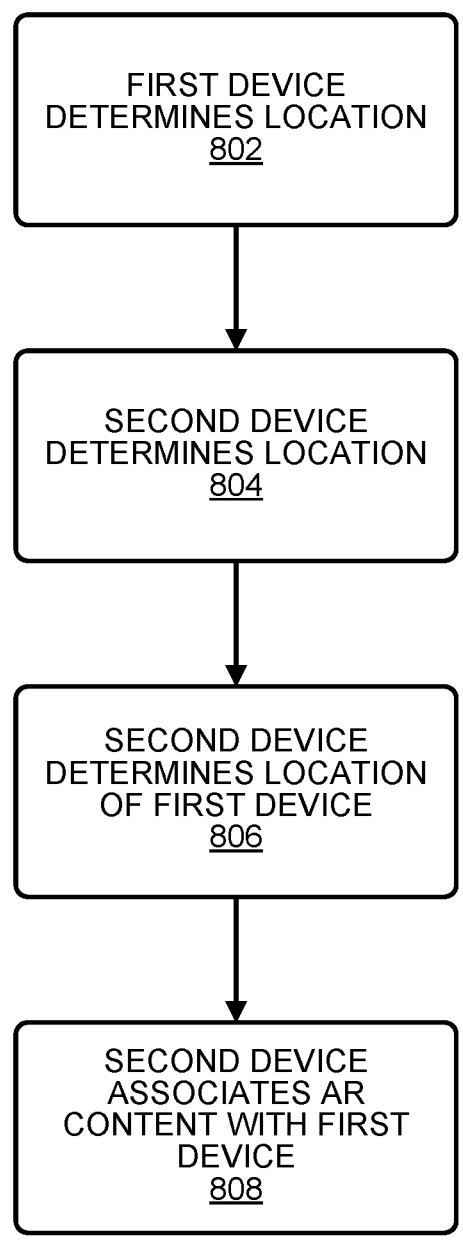
FIG. 8 illustrates a third logic flow.

FIG. 8 illustrates an example of a logic flow 800 that may be representative of techniques for associating AR content to moveable objects. For example, the logic flow 800 may be representative of operations that may be performed in various embodiments by any constituent component of the operating environment 700 (e.g., the computing devices 704 and/or 706) depicted in FIG. 7.

At 802, a first computing device associated with a moving object can determine its location relative to a fixed AR marker. The first computing device can then transmit or report its determined location to a remote computing system.

At 804, a second computing device can determine its position relative to the fixed AR marker. The second computing device can be associated with a fixed object or a moveable object.

At 806, the second computing device can receive location information for the first computing device from the remote computing system. The second computing system can determine a confirmed location of the first computing device relative to the second computing device based on the determined location of the second computing device and the reported location of the first computing device.

At 808, the second computing device can position the first computing device within a field of view of the second computing device and/or an optical system (e.g., camera) thereof. The second computing device can generate AR content related to the first computing device and can display the AR content adjacent to the display of the first computing device on, for example, a display of the second computing device. The display of the first computing device and the generated AR content can be dynamically updated as the location of the first computing device changes.

Figure 9:
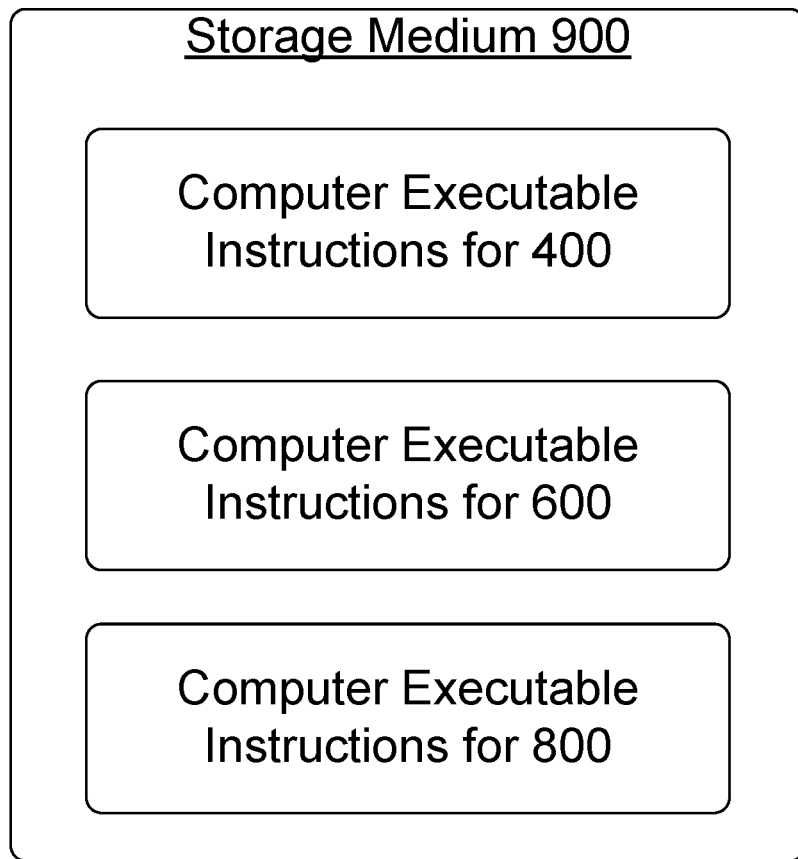
FIG. 9 illustrates a storage medium.

FIG. 9 illustrates a storage medium 900. Storage medium 900 may represent an implementation of a storage device of any computing device that may operate within the operating environment 100 of FIG. 1 (e.g., the computing device 104), any computing device that may operate within the operating environment 500 of FIG. 5 (e.g., any of the computing devices 504-512), or any computing device that may operate within the operating environment 700 of FIG. 7 (e.g., any of the computing devices 704-706). The storage medium 900 can comprise any non-transitory computer-readable storage medium or machine-readable storage medium. In various embodiments, the storage medium 900 can comprise a physical article of manufacture. In various embodiments, storage medium 900 can store computer-executable instructions, such as computer-executable instructions to implement one or more of logic flows or operations described herein, such as the logic flow 400 of FIG. 4, the logic flow 600 of FIG. 6, or the logic flow 800 of FIG. 8. In various embodiments, storage medium 900 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 10:
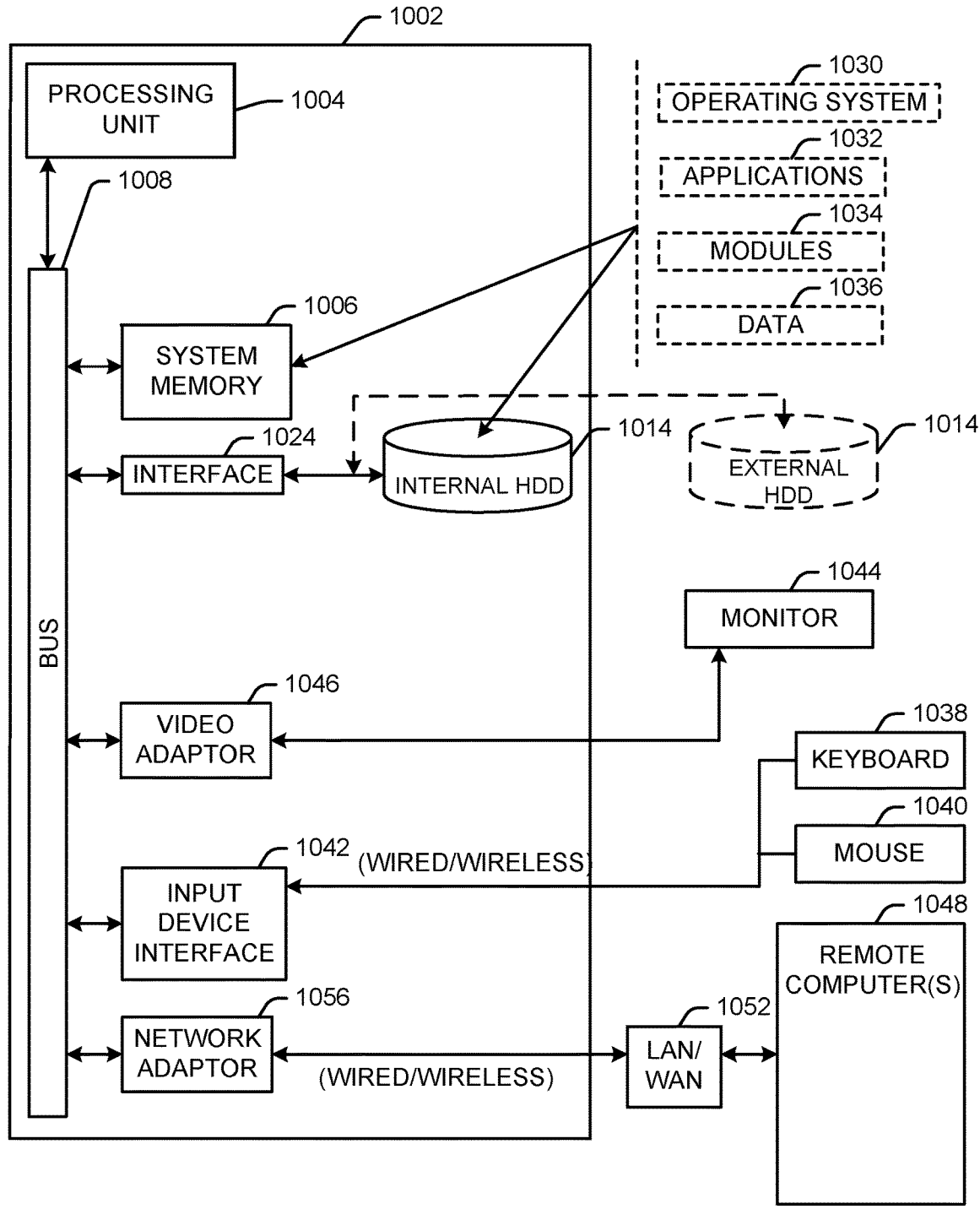
FIG. 10 illustrates a computing architecture.

FIG. 10 illustrates a computing architecture 1000 that can implement various embodiments described herein. In various embodiments, the computing architecture 1000 can comprise or be implemented as part of an electronic device and/or a computing device. In various embodiments, the computing architecture 1000 can represent an implementation of any constituent component of the operating environment 100 depicted in FIG. 1. One or more of the constituent components of the computing architecture 1000, and/or any constituent component of the operating environment 100, can be implemented in hardware, software, or any combination thereof including implementation based on a storage device (e.g., a memory unit) and logic, at least a portion of which is implemented in circuitry and coupled to the storage device. The logic can be or can include a processor or controller component such as, for example, a processor or controller that executes code stored in the storage device.

The computing architecture 1000 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 10, the computing architecture 1000 can comprise a computer 1002 having a processing unit 1004, a system memory 1006 and a system bus 1008. The processing unit 1004 can be any of various commercially available processors or can be a specially designed processor.

The system bus 1008 provides an interface for system components including, but not limited to, an interface between the system memory 1006 and the processing unit 1004. The system bus 1008 can be any of several types of bus structure that may further interconnect to a memory bus (with or without a memory controller), a peripheral bus, and a local bus using any of a variety of commercially available bus architectures.

The system memory 1006 can include any type of computer-readable storage media including any type of volatile and non-volatile memory. The computer 1002 can include any type of computer-readable storage media including an internal (or external) hard disk drive (HDD) 1014. In various embodiments, the computer 1002 can include any other type of disk drive such as, for example, a magnetic floppy disk and/or an optical disk drive. The HDD 1014 can be connected to the system bus 1008 by a HDD interface 1024.

In various embodiments, any number of program modules can be stored in the drives and memory units 1006 and/or 1014 such as, for example, an operating system 1030, one or more application programs 1032, other program modules 1034, and program data 1036.

A user can enter commands and information into the computer 1002 through one or more wired/wireless input devices such as for example, a keyboard 1038 and a pointing device, such as a mouse 1040. These and other input devices can be connected to the processing unit 1004 through an input device interface 1042 that is coupled to the system bus 1008. A monitor 1044 or other type of display device can also be connected to the system bus 1008 via an interface, such as a video adaptor 1046. The monitor 1044 may be internal or external to the computer 1002.

The computer 1002 may operate in a networked environment using logical connections via wired and/or wireless communications to one or more remote computers, such as a remote computer 1048. The remote computer 1048 can be a workstation, a server computer, a router, a personal computer, portable computer, microprocessor-based entertainment appliance, a smartphone, a tablet, a peer device or other common network node, and typically includes many or all of the elements described relative to the computer 1002. The logical connections depicted include wired and/or wireless connectivity to networks 1052 such as, for example, a local area network (LAN) and/or larger networks, for example, a wide area network (WAN). Networks 1052 can provide connectivity to a global communications network such as, for example, the Internet. A network adapter 1056 can facilitate wired and/or wireless communications to the networks 1052. The computer 1002 is operable to communicate over any known wired or wireless communication technology, standard, or protocol according to any known computer networking technology, standard, or protocol.

Figure 11:
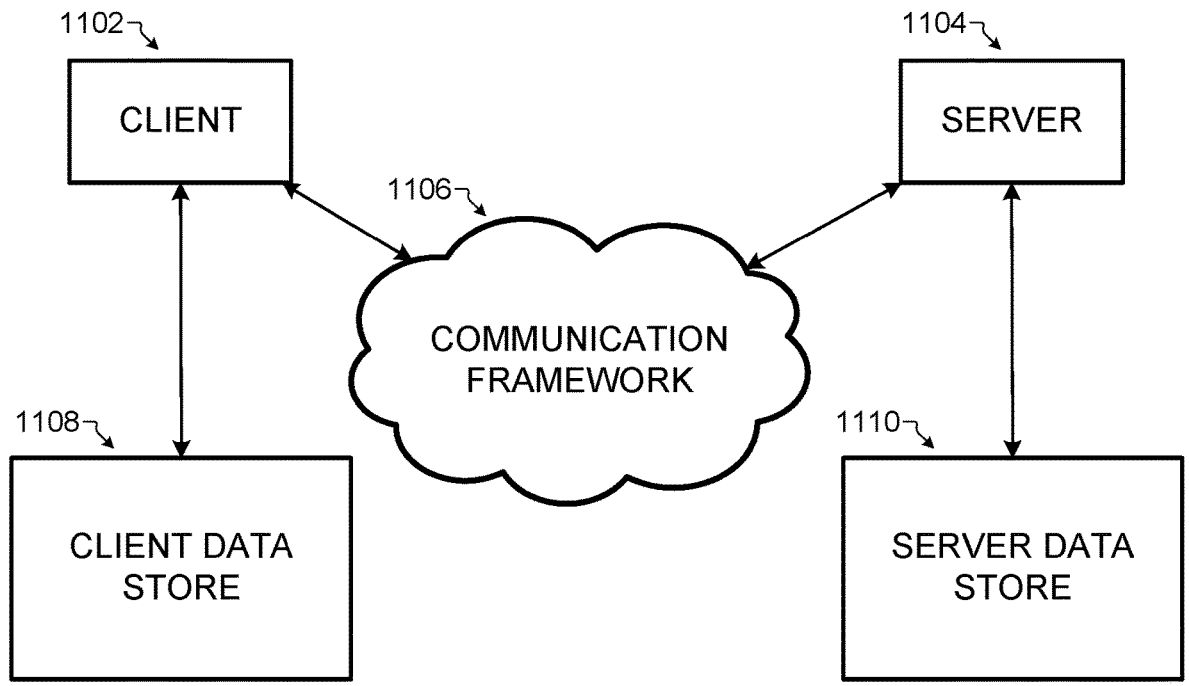
FIG. 11 illustrates a communication architecture.

FIG. 11 illustrates a block diagram of a communication architecture 1100. The communication architecture 1100 can implement various embodiments described herein. As shown in FIG. 11, the communication architecture 1100 comprises one or more clients 1102 and servers 1104. One of the clients 1102 and/or one of the servers 1104 can represent any constituent component of the operating environment 100 depicted in FIG. 1, the operating environment 500 depicted in FIG. 5, or the operating environment 700 depicted in FIG. 7.

The client 1102 and the server 1104 can be operatively connected to a client data store 1108 and a server data store 1110, respectively, that can be employed to store information local to the respective client 1102 and server 1104. In various embodiments, the client 1102 and/or the server 1104 can implement one or more of logic flows or operations described herein.

The client 1102 and the server 1104 can communicate data or other information between each other using a communication framework 1106. The communications framework 1106 can implement any known communications technique or protocol. The communications framework 1106 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 1106 can operate over any communication media according to any networking technology including any wired or wireless communications standard or protocol, or any combination thereof.

The following set of first examples pertain to further embodiments.

Example 1 is a computing device comprising a storage device, a display, and logic, at least a portion of the logic implemented in circuitry coupled to the storage device and the display, the logic to display on the display a movable object comprising an augmented reality marker when the augmented reality marker is within a field of view of the computing device, identify the augmented reality marker based on augmented reality marker information stored in the storage device, retrieve physical attribute information of the augmented reality marker stored in the storage device, receive a location of the augmented reality marker from a remote computing device, the location of the augmented reality marker based on a distance between the augmented reality marker and a fixed augmented reality marker, the fixed augmented reality marker outside of the field of view of the computing device, determine a distance between the computing device and the augmented reality marker based on the physical attribute information of the augmented reality marker, and determine a location of the computing device based on the distance between the computing device and the augmented reality marker and the location of the augmented reality marker.

Example 2 is an extension of Example 1 or any other example disclosed herein, the logic to display on the display a first additional movable object comprising a first additional augmented reality marker when the first additional augmented reality marker is within a first additional field of view of the computing device, identify the first additional augmented reality marker based on first additional augmented reality marker information stored in the storage device, retrieve first additional physical attribute information of the first additional augmented reality marker stored in the storage device, receive a first additional location of the first additional augmented reality marker from the remote computing device, the first additional location of the first additional augmented reality marker based on a first additional distance between the first additional augmented reality marker and the fixed augmented reality marker, the fixed augmented reality marker outside of the first additional field of view of the computing device, determine a first additional distance between the computing device and the first additional augmented reality marker based on the first additional physical attribute information of the first additional augmented reality marker, and determine a first additional location of the computing device based on the first additional distance between the computing device and the first additional augmented reality marker and the first additional location of the first additional augmented reality marker.

Example 3 is an extension of Example 2 or any other example disclosed herein, the logic to determine a modified location of the computing device based on averaging the location of the computing device based on the distance between the computing device and the augmented reality marker and the location of the augmented reality marker and the first additional location of the computing device based on the first additional distance between the computing device and the first additional augmented reality marker and the first additional location of the first additional augmented reality marker.

Example 4 is an extension of Example 3 or any other example disclosed herein, the logic to display on the display a virtual marker indicating a direction of travel towards a desired destination indicated by a user of the computing device based on the modified location of the computing device.

Example 5 is an extension of Example 4 or any other example disclosed herein, the logic to dynamically update the display of the virtual marker indicating the direction of travel towards the desired destination indicated by the user as the user travels towards the desired destination.

Example 6 is an extension of Example 1 or any other example disclosed herein, the logic to determine the distance between the computing device and the augmented reality marker based on a first feature point of the augmented reality marker, a second feature point of the augmented reality marker, and a distance between the first and second feature points of the augmented reality marker stored in the storage device.

Example 7 is an extension of Example 1 or any other example disclosed herein, the logic to determine the distance between the computing device and the augmented reality marker based on a feature point of the augmented reality marker viewed by the computing device at a first location of the computing device and viewed at a second location of the computing device and a determined distance between the first and second locations of the computing device.

Example 8 is an extension of Example 1 or any other example disclosed herein, the location of the computing device to comprise a latitude and a longitude of the computing device.

Example 9 is an extension of Example 1 or any other example disclosed herein, the augmented reality marker comprising a two-dimensional marker.

Example 10 is an extension of Example 9 or any other example disclosed herein, the augmented reality marker comprising a quick response (QR) code.

Example 11 is a method performing any of the steps or functions (e.g., performed by the logic of the computing device) recited in any of the Examples 1-10.

Example 12 is at least one non-transitory computer-readable medium comprising a set of instructions that, in response to being executed on a computing device, cause the computing device to implement any of the steps of functions (e.g., performed by the logic of the computing device) recited in any of the Examples 1-10.

The following set of second examples pertain to further embodiments.

Example 1 is a computing device comprising a storage device, a display, and logic, at least a portion of the logic implemented in circuitry coupled to the storage device and the display, the logic to display on the display a fixed augmented reality marker when the fixed augmented reality marker is within a field of view of the computing device, receive location information of the fixed augmented reality marker from a remote computing device, determine a distance between the computing device and the fixed augmented reality marker, determine a location of the computing device based on the distance between the computing device and the augmented reality marker and the location information of the fixed augmented reality marker, receive a reported location of a movable object from the remote computing device, the reported location determined by the movable object, determine a confirmed location of the movable object based on the reported location of the movable object and the location of the computing device, display on the display the movable object when the movable object is within the field of view of the computing device, and display on the display augmented reality content adjacent to the movable object based on the confirmed location of the movable object.

Example 2 is an extension of Example 1 or any other example disclosed herein, the reported location of the movable object based on a distance between the movable object and the fixed augmented reality marker.

Example 3 is an extension of Example 1 or any other example disclosed herein, the logic to dynamically update the display of the augmented reality content as the movable object moves within the field of view of the computing device.

Example 4 is an extension of Example 1 or any other example disclosed herein, the logic to dynamically update the display of the augmented reality content based on additional augmented reality content received from the remote computing device.

Example 5 is an extension of Example 1 or any other example disclosed herein, the augmented reality content to comprise at least one of a graphical content and a textual content.

Example 6 is an extension of Example 1 or any other example disclosed herein, the logic to determine the distance between the computing device and the fixed augmented reality marker based on a first feature point of the fixed augmented reality marker, a second feature point of the fixed augmented reality marker, and a distance between the first and second feature points of the fixed augmented reality marker stored in the storage device.

Example 7 is an extension of Example 1 or any other example disclosed herein, the logic to determine the distance between the computing device and the fixed augmented reality marker based on a feature point of the fixed augmented reality marker viewed by the computing device at a first location of the computing device and viewed at a second location of the computing device and a determined distance between the first and second locations of the computing device.

Example 8 is an extension of Example 1 or any other example disclosed herein, the location of the computing device to comprise a latitude and a longitude of the computing device.

Example 9 is an extension of Example 1 or any other example disclosed herein, the reported location of the movable object to comprise a latitude and a longitude of the movable object.

Example 10 is an extension of Example 1 or any other example disclosed herein, the augmented reality marker comprising a two-dimensional marker.

Example 11 is an extension of Example 10 or any other example disclosed herein, the augmented reality marker comprising a quick response (QR) code.

Example 12 is a method performing any of the steps or functions (e.g., performed by the logic of the computing device) recited in any of the Examples 1-11.

Example 13 is at least one non-transitory computer-readable medium comprising a set of instructions that, in response to being executed on a computing device, cause the computing device to implement any of the steps of functions (e.g., performed by the logic of the computing device) recited in any of the Examples 1-11.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. A computing device, comprising:
a storage device;
a display; and
logic, at least a portion of the logic implemented in circuitry coupled to the storage device and the display, the logic to:
determine a first distance between the computing device and a first movable augmented reality (AR) marker based on a location of the first movable AR marker;
determine a first location estimate of the computing device based on the first distance, a rotational position relative to the first movable AR marker, and the location of the first movable AR marker;
determine a second distance between the computing device and a second movable AR marker based on a location of the second movable AR marker;
determine a second location estimate of the computing device based on the second distance, a rotational position relative to the second movable AR marker, and the second location of the second movable AR marker; and
determine a modified estimated location based on an average of the first location estimate and the second location estimate.

2. The computing device of claim 1, the logic to:
determine a third distance between the computing device and a third movable AR marker based on a location of the third movable AR marker;
determine a third location estimate of the computing device based on the third distance, a rotational position relative to the third movable AR marker, and the third location of the third movable AR marker; and
update the modified estimated location based on an average of the first location estimate, the second location estimate, and the third location estimate.

3. The computing device of claim 2, wherein the first movable AR marker is associated with a first mobile device, the second movable AR marker is associated with a second mobile device, and the third movable AR marker is associated with a third mobile device.

4. The computing device of claim 1, the logic to:
retrieve the location of the first movable AR marker from a remote computing device;
retrieve the location of the second movable AR marker from the remote computing device; and
retrieve the third location of the third movable AR marker from the remote computing device.

5. The computing device of claim 1, the logic to send the modified estimate location to a remote computing device.

6. The computing device of claim 1, comprising a display, and the logic to:
display on the display the first movable AR marker when the first movable AR marker is within a field of view of the computing device;
identify the first movable AR marker based on augmented reality marker information stored in the storage device;
retrieve the location of the first movable AR marker from the remote computing device based on identifying the first movable AR marker;
display on the display the second movable AR marker when the second movable AR marker is within the field of view of the computing device;
identify the second movable AR marker based on augmented reality marker information stored in the storage device; and
retrieve the location of the second movable AR marker from the remote computing device based on identifying the second movable AR marker.

7. The computing device of claim 1, the location of the computing device to comprise a latitude and a longitude of the computing device.

8. The computing device of claim 1, wherein the first movable AR marker and the second movable AR marker are two-dimensional markers.

9. The computing device of claim 1, wherein the first movable AR marker and the second movable AR marker are quick response (QR) codes.

10. A computer-implemented method, comprising:
- determining a first distance between the computing device and a first movable augmented reality (AR) marker based on a location of the first movable AR marker;
- determining a first location estimate of the computing device based on the first distance, a rotational position relative to the first movable AR marker, and the location of the first movable AR marker;
- determining a second distance between the computing device and a second movable AR marker based on a location of the second movable AR marker;
- determining a second location estimate of the computing device based on the second distance, a rotational position relative to the second movable AR marker, and the second location of the second movable AR marker; and
- determining a modified estimated location based on an average of the first location estimate and the second location estimate.

11. The computer-implemented method of claim 10, comprising:
- determining a third distance between the computing device and a third movable AR marker based on a location of the third movable AR marker;
- determining a third location estimate of the computing device based on the third distance, a rotational position relative to the third movable AR marker, and the third location of the third movable AR marker; and
- updating the modified estimated location based on an average of the first location estimate, the second location estimate, and the third location estimate.

12. The computer-implemented method of claim 10, wherein the first movable AR marker is associated with a first mobile device, the second movable AR marker is associated with a second mobile device, and the third movable AR marker is associated with a third mobile device.

13. The computer-implemented method of claim 10, comprising:
- retrieving the location of the first movable AR marker from a remote computing device;
- retrieving the location of the second movable AR marker from the remote computing device; and
- retrieving the third location of the third movable AR marker from the remote computing device.

14. The computer-implemented method of claim 10, comprising:
- displaying on the display the first movable AR marker when the first movable AR marker is within a field of view of the computing device;
- identifying the first movable AR marker based on augmented reality marker information stored in the storage device;
- retrieving the location of the first movable AR marker from the remote computing device based on identifying the first movable AR marker;
- displaying on the display the second movable AR marker when the second movable AR marker is within the field of view of the computing device;
- identifying the second movable AR marker based on augmented reality marker information stored in the storage device; and
- retrieving the location of the second movable AR marker from the remote computing device based on identifying the second movable AR marker.

15. The computer-implemented method of claim 10, wherein the first movable AR marker and the second movable AR marker are two-dimensional markers.

16. The computer-implemented method of claim 15, wherein the first movable AR marker and the second movable AR marker are quick response (QR) codes.

17. A non-transitory computer-readable medium comprising a set of instructions that, in response to being executed on a computing device, cause the computing device to:
- determine a first distance between the computing device and a first movable augmented reality (AR) marker based on a location of the first movable AR marker;
- determine a first location estimate of the computing device based on the first distance, a rotational position relative to the first movable AR marker, and the location of the first movable AR marker;
- determine a second distance between the computing device and a second movable AR marker based on a location of the second movable AR marker;
- determine a second location estimate of the computing device based on the second distance, a rotational position relative to the second movable AR marker, and the second location of the second movable AR marker; and
- determine a modified estimated location based on an average of the first location estimate and the second location estimate.

18. The non-transitory computer-readable medium of claim 17, wherein the first movable AR marker is associated with a first mobile device, and the second movable AR marker is associated with a second mobile device.

19. The non-transitory computer-readable medium of claim 17, the computing device to:
- retrieve the location of the first movable AR marker from a remote computing device; and
- retrieve the location of the second movable AR marker from the remote computing device.

20. The non-transitory computer-readable medium of claim 17, the computing device to send the modified estimate location to a remote computing device.

* * * * *